United States Patent
Bizard

(10) Patent No.: US 7,307,393 B2
(45) Date of Patent: Dec. 11, 2007

(54) WINDOW ANTI-PINCH SYSTEM ACTIVATING METHOD

(75) Inventor: Paul Bizard, Sully-sur-Loire (FR)

(73) Assignee: ArvinMeritor Light Vehicle Systems - France, Sully-sur-Loire (FR)

( * ) Notice: Subject to any disclaimer, the term of this patent is extended or adjusted under 35 U.S.C. 154(b) by 0 days.

(21) Appl. No.: 11/244,816

(22) Filed: Oct. 6, 2005

(65) Prior Publication Data

US 2006/0082338 A1    Apr. 20, 2006

(30) Foreign Application Priority Data

Oct. 15, 2004    (FR)    ................... 04 10939

(51) Int. Cl.
*H02P 1/00* (2006.01)
*H02P 1/22* (2006.01)
*H02P 1/40* (2006.01)
*H02P 3/00* (2006.01)
*H02P 3/20* (2006.01)

(52) U.S. Cl. .................... 318/285; 318/282
(58) Field of Classification Search .................... None
See application file for complete search history.

(56) References Cited

U.S. PATENT DOCUMENTS

| 5,422,551 A | 6/1995 | Takeda et al. |
| 6,086,177 A | 7/2000 | Driendl et al. |
| 6,114,822 A | 9/2000 | Ubelein et al. |
| 6,936,984 B2* | 8/2005 | Wilson ....................... 318/280 |
| 2006/0082337 A1* | 4/2006 | Fitzgibbon et al. .......... 318/283 |
| 2006/0208678 A1* | 9/2006 | Choby ........................ 318/280 |

FOREIGN PATENT DOCUMENTS

DE    195 14 257    7/1996

* cited by examiner

*Primary Examiner*—Lincoln Donovan
*Assistant Examiner*—Erick Glass
(74) *Attorney, Agent, or Firm*—Carlson, Gaskey & Olds

(57) ABSTRACT

A method for activating an anti-pinch system for a vehicle window regulator, sunroof or driving mechanism includes the steps of starting a motor of the driving mechanism, waiting for a given rotation of the motor and a given time period, and then activating the anti-pinch system. This allows for close monitoring of the behavior of the window regulator when the window regulator is started, and takes account of both the behavior of the drive motor and the behavior of the driving mechanism.

12 Claims, 2 Drawing Sheets

WINDOW ANTI-PINCH SYSTEM ACTIVATING METHOD

REFERENCE TO RELATED APPLICATION

This application claims priority to French Patent Application FR 04 10 939 filed on Oct. 15, 2004.

BACKGROUND OF THE INVENTION

This invention relates generally to a method for activating an anti-pinch system.

Vehicle power window regulators are often equipped with a device for detecting an obstruction during the closing movement of a window. The detection of the obstruction during the closing movement of the window generally depends on monitoring the behavior of one of the state variables of the motor, such as the current or the rotating speed of the motor.

During the shifting movement of the window and for a constant supply voltage, the speed or the current of the motor is representative of the motor load and the resistance exerted by the window. An obstruction is detected during the closing movement of the window if the behavior of the current or the speed differs from a normal behavior. In this case, the motor is stopped or even reversed.

A problem is that when the window drive motor is started, the speed or the current is not representative of the load on the motor. In the event that there is backlash in the mechanism, the speed of the motor increases very rapidly during start-up, then decreases before stabilizing. The current of the motor, after the initial inrush current, decreases very rapidly, then increases before stabilizing. The particular behavior of the current and the speed when the motor is started produces the detection by the device of the fictitious presence of an obstruction and the stopping or reversal of the movement of the motor.

To prevent this risk when the motor starts, the obstruction detection systems are activated only after a delay relative to the start-up of the motor. The criterion for delaying the activation of the obstruction detection systems is, for example, a time criterion or a criterion linked to the number of motor revolutions already completed.

The drawback is that the criteria adopted for delaying the activation of the anti-pinch systems is inaccurate and lead to a substantial risk of pinching of the obstruction if the obstruction is already present in the path of the window close to an upper edge of the window.

A need therefore exists for a more accurate activation of obstruction detection systems in the path of an openable member of a vehicle such as a window or the like to reduce the pinching force when an obstruction is present on start-up.

SUMMARY OF THE INVENTION

The invention provides a method for activating an anti-pinch system for a vehicle openable member driving mechanism, the driving mechanism including a drive motor. The method includes the steps of starting up the drive motor, waiting for a given rotation of the motor, then waiting for a given time period and activating the anti-pinch system.

According to one embodiment, the rotation of the motor is detected by a Hall effect sensor. According to another embodiment, the rotation of the motor is at least partially determined with a model of the driving mechanism. According to another embodiment, the rotation of the motor is at least partially determined according to the type of driving mechanism and the operating conditions of the driving mechanism.

According to one embodiment, the method also includes the step of updating the rotation partially determined by a model of the driving mechanism. According to one embodiment, the time period is determined as a function of a mechanical time constant of the motor. According to another embodiment, the time period is less than or equal to three times the motor constant.

According to one embodiment, the openable member is moveable in an opening and the method also includes the step of detecting the position of the openable member in the opening. The step of activating the anti-pinch system depends on the position of the openable member in the opening.

According to one embodiment, the openable member is moveable in two opposite directions in an opening. The method also includes a preliminary step of detecting the direction of movement of the openable member in the opening, and the step of activating the anti-pinch system depends on the direction of movement of the openable member in the opening.

The invention also relates to an anti-pinch system with a module. The module includes a routine for the detection of the start-up of the drive motor, a routine for waiting for a given rotation of the motor, a routine for waiting for a given time period, and a routine for activating the anti-pinch system.

The invention also relates to a door including a window, a window regulator driving the window and the anti-pinch system described above. According to one embodiment, the anti-pinch system implements the method as described previously.

Other characteristics and advantages of the invention will become apparent on reading the following detailed description of the embodiments of the invention, given as an example only and with reference to the drawings.

DETAILED DESCRIPTION OF PREFERRED EMBODIMENTS

The invention provides a method for activating an anti-pinch system for a vehicle openable member driving mechanism. The method includes the steps of starting a motor of the driving mechanism, then waiting for a given rotation of the motor and a given time period, and then activating the anti-pinch system. The method allows for close monitoring of the behavior of the window regulator when the window regulator is started. The activation of the anti-pinch system is carried out taking account of both the behavior of the drive motor and the behavior of the driving mechanism. The activation of the anti-pinch system is thus carried out as close as possible to the operating profile of the openable member driving mechanism. The activation of the anti-pinch system is therefore carried out in an accurate manner.

Figure 1:
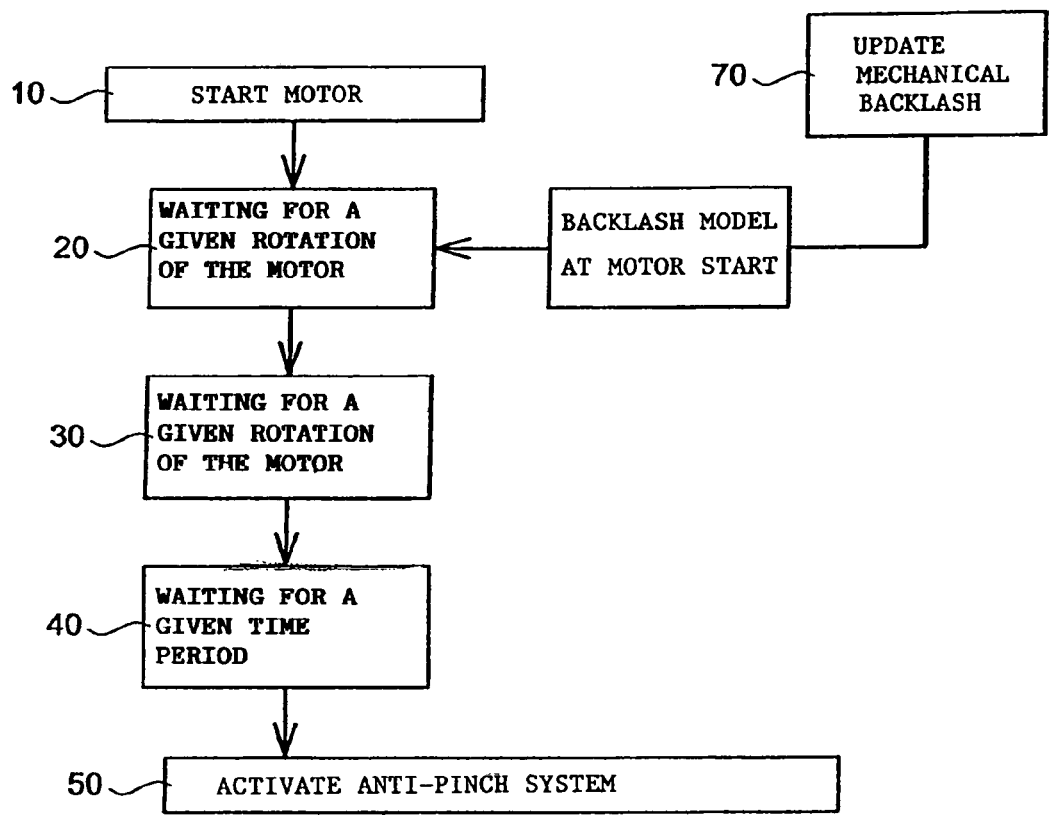
FIG. 1 shows a flow chart of the implementation of the method of the present invention.

FIG. 1 shows a flow chart of the implementation of a method for activating an anti-pinch system for a vehicle openable member driving mechanism. The openable member may be a sun roof and its driving mechanism. In the following, and as an example, the openable member is a window, and the driving mechanism is a window regulator. The window regulator includes a drive motor driving a cable that runs along a cable run, in particular along one or more guide rails and around direction-changing means (such as pulleys). The cable, in turn, drives the window by at least one slide guided along one of the guide rails. However, the cable window regulator is given as an example and could also be an arm and sector window regulator, for example.

In FIG. 1, the method includes a step 10 of starting-up the drive motor. The method then includes steps 20 and 30, during which a given rotation (i.e., a number of revolutions) of the motor is awaited. The method then includes a step 40 of waiting for a given time period before a step 50 of activating the anti-pinch system. Thus, the activation of the anti-pinch system is sufficiently delayed relative to the start-up of the motor so that the operation of the anti-pinch system is not hindered by the interference occurring when the motor and the driving mechanism start. However, the anti-pinch system is also activated sufficiently early relative to the start of movement of the openable member to be able to take action in the event of an obstruction being present in the path of the openable member and prevent pinching.

Figure 2:
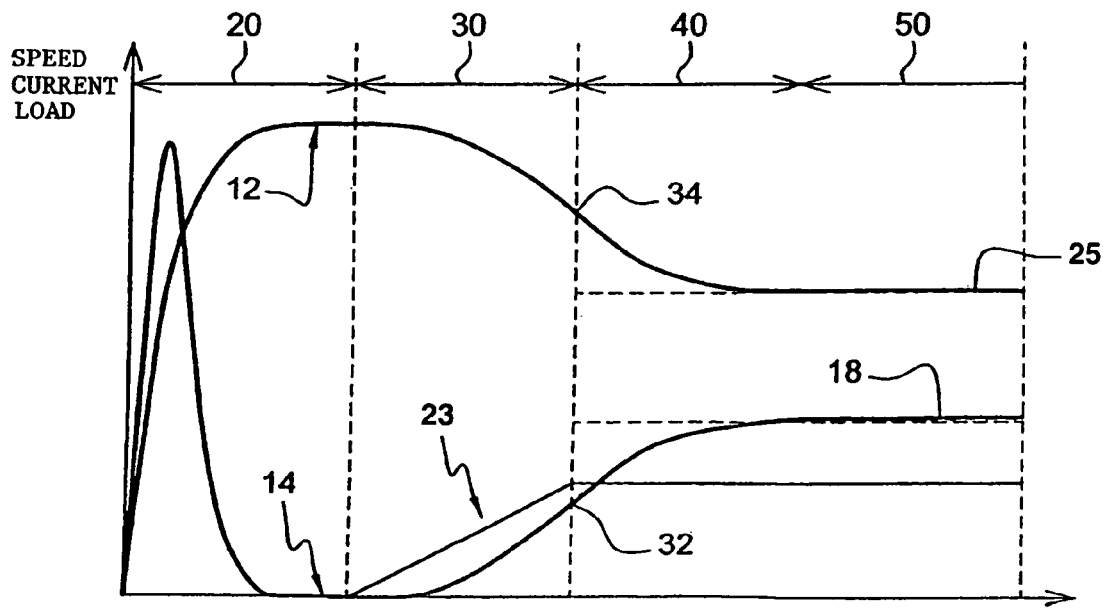
FIG. 2 is a graph of the behavior of a vehicle openable member driving mechanism.

FIG. 2 shows a graph of the behavior of a vehicle openable member driving mechanism on start-up. The graph includes the time on the x-axis and the motor speed, the current supplying the motor and the motor load on the y-axis. The graph shows several curves. One curve 12 relates to the evolution of the rotating speed of the motor, and one curve 14 relates to the evolution of the supply current of the motor. These curves show the behavior of the speed and the intensity of the current in the time immediately following the motor start-up step 10. The graph also compares the speed and the current with the behavior of the window regulator at the instant when the motor starts, namely, the steps 20 and 30 of waiting for a given rotation of the motor, the step 40 of waiting for a time period and the step 50 of activating the anti-pinch system. As an example, the step 20 corresponds to 5 motor revolutions, the step 30 corresponds to 3.5 motor revolutions, and the step 40 lasts for approximately 60 ms.

The curve 14 shows the behavior of the motor supply current after the motor has started. The curve 14 has a peak 16 corresponding to the motor inrush current. The current then decreases very rapidly to a minimum corresponding to the end of the compensation for the backlash present in the mechanism before start-up. The curve 14 then rises until it stabilizes at a value 18. During this last rise, the curve 14 has an inflection point 32 that marks the start of movement of the window.

The curve 12 shows the behavior of the motor speed after the motor has started. The speed increases very rapidly initially because of the peak 16 of inrush current on the curve 14 and the low level of the resisting torque because the window is not yet moving. The curve 12 stabilizes at a value corresponding to the mechanical torque exerted by the rotor. At this step, during compensation for the backlash in the window regulator, the window has not yet started, but there is mechanical torque which is produced by the friction. The speed tends to stabilize at the value corresponding to this mechanical torque. If the torque was zero (no friction), the speed would stabilize at the value U/R, and the current would stabilize at the value zero. The curve 12 then falls until it stabilizes at a lesser value 25 corresponding to the resisting torque required to drive the window in conjunction with the stabilization in time of the curve 14. During this last fall, the curve 12 has an inflection point 34 that, like the inflection point 32, marks the start of movement of the window.

The graph also shows a third curve 23 corresponding to the evolution of the motor load. The load on the motor increases only after the extinction of the peak 16 of inrush current. During this phase of increase in the motor load, the window regulator is loaded, as will be explained in more detail below. The curve 23 rises until it stabilizes. The curve 23 stabilizes at the same instant as the inflection points 32 and 34 appear. Thus, the stabilization of the curve 23 corresponds to the start of movement of the window.

The different steps will now be described in more detail. The step 10 corresponds to the start-up of the drive motor. For an electric window regulator, this step can be implemented simply by pressing on a button activating the window regulator.

The steps 20 and 30 of waiting for a given rotation of the motor allows a period of time to elapse during which the window regulator is powered up. During this time, the variations in the motor current and speed are greatest. The waiting step is implemented using the knowledge or the prediction of the behavior of the driving mechanism when the drive motor starts and before the start of movement of the window. To determine the revolution of the motor to be completed, the waiting step can be split into several phases or steps 20 and 30. The step 20 is a step of absorption of the backlash, and the step 30 is a step of loading the window regulator.

The step of waiting for a given rotation can firstly include the step 20 of absorbing the backlash. The determination of the rotation of the motor during the step 20 allows for the partial determination of the rotation of the motor to be awaited before the step 40. After repeated operation of the window regulator, the cable of the window regulator can become slack, and the cable guide pulleys tends to wear down, etc. This creates space for backlash. Thus, the motor will be driven for a certain number of revolutions to absorb the backlash in the empty space. As an example, the step 20 corresponds to 5 motor revolutions. To determine the rotation that the motor completes to absorb the backlash, reference can be made to an operating model for the window regulator.

Figure 3:
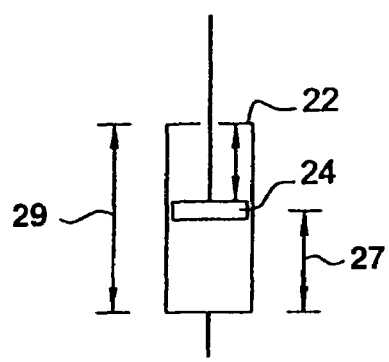
FIG. 3 shows a model of the driving mechanism.

FIG. 3 represents the model used to determine the backlash. The model uses an analogy with the sliding mechanism for a drawer 24 including a guiding slideway 22 in which the drawer 24 can slide. The guiding slideway 22 corresponds to the total mechanical backlash of the window regulator, and it is the maximum rotation of the motor before the window movement is started. The length 29 of the guiding slideway increases as a function of use of the window regulator, which indicates that the total mechanical backlash changes during the lifetime of the window regulator. When the guiding slideway 22 starts to be driven by the drawer 24, this corresponds to the movement of the window. The drawer 24 corresponds to the motor. The movement of the drawer 24 corresponds to the rotation of the motor. Finally, the distance 27 the drawer needs to move to reach one of the ends of the guiding slideway 22 corresponds to the backlash to be absorbed.

Figure 4:
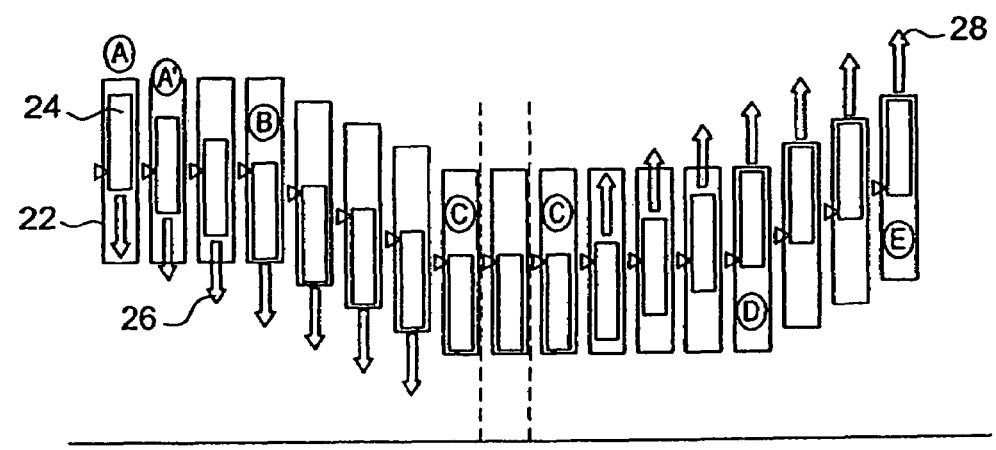
FIG. 4 shows another model of the driving mechanism.

FIG. 4 shows the evolution of the backlash present. The different relative positions of the guiding slideway 22 and the drawer 24 are shown. Depending on whether the window is activated upwards (right hand section of FIG. 4) or downwards (left hand section of FIG. 4), the drawer 24 moves up or down until it comes into contact with one end of the guiding slideway 22. As long as the drawer 24 is not up against one end, the window is not driven. This corresponds to the absorption of the backlash present in the window regulator. Once the drawer 24 is up against one of the ends of the guiding slideway 22, the movement of the drawer 24 is continued to drive the guiding slideway 22 in its movement. This corresponds to the start of the loading of the window regulator.

The modeling of the movements of the window is carried out as follows. On the left hand section of FIG. 4, the lowering of the window is modeled. The drawer is first shown in position A. The drawer 24 is shown at the upper end of the guiding slideway 22. The drawer 24 is moved downwards along the arrow 26 to the position B in which the drawer 24 comes into contact with the lower end of the guiding slideway 22 in FIG. 3. This corresponds to the start-up of the motor to lower the window. Between positions A and B, the rotating motor absorbs the backlash present, but the movement of the window is not yet started. The movement of the drawer 24 and therefore of the motor is continued to position C. The drawer 24 drives the guiding slideway 22 downwards. This shows that the backlash present is finally absorbed and that the window regulator is under load and then that the window is driven downwards. Between the dotted lines, the motor is stopped.

In the right hand section of FIG. 4, the raising of the window is then modeled. The drawer 24 is first shown in position C, following the lowering described previously. The drawer 24 is then at the lower end of the guiding slideway 22. The drawer 24 is raised along the arrow 28 to position D in which the drawer 24 comes into contact with the upper end of the guiding slideway 22 in FIG. 3. This corresponds to the start-up of the motor to raise the window. Between the positions C and D, the rotating motor absorbs the backlash present, but the movement of the window is not yet started. The movement of the drawer 24 and therefore of the motor is continued to position E. The drawer 24 drives the guiding slideway 22 upwards. This shows that the backlash present is absorbed, the window regulator is under load and then the window is driven upwards.

Thus, this modeling allows for the determination of the rotation of the motor to absorb the backlash. The model is programmed, and a pulse counter controls the position of the drawer 24 in the guiding slideway 22. The length of the guiding slideway 22 is measured during a closing step of the window. This is the distance covered by the motor, in pulses, from its start-up to the maximum speed (or minimum current) in the particular case in which the drawer 24 has started at the lower end of the guiding slideway.

In the example in FIG. 4, the upwards movement of the drawer 24 (and then of the window) takes place after a downwards movement of the drawer 24 (and then of the window). The drawer 24 travels, for example, between positions C and D, the entire length of the guiding slideway 22. The backlash present to be absorbed corresponds to the total mechanical play of the window regulator (length of the guiding slideway). However, if a brief rotation of the motor in one direction (for example, downwards between positions A and A') is carried out, the drawer in position A' is not up against the lower end of the guiding slideway 22. The subsequent rotation of the motor in the other direction (for example upwards from position A') causes the movement of the drawer 24 towards the other end over a shorter path than the total mechanical play. The backlash present which is absorbed is then less than the total mechanical play.

Between two window movements in the same direction, there is no more backlash present to be absorbed. The window, which has undergone an upwards movement, is modeled, for example, by position E of the drawer 24 up against the upper end of the guiding slideway 22. When a subsequent upwards movement of the window along the arrow 28 is ordered, the drawer 24 is already against the upper end of the guiding slideway 22, which corresponds to zero backlash present. The guiding slideway 22, and therefore the window, is thus driven upwards without having to absorb any backlash present.

The absorption of the backlash present by the drawer 24 therefore depends on both the total mechanical play (length of the guiding slideway 22) and the play before start-up (initial position of the drawer 24 in the guiding slideway 22). The absorption of the play by the motor therefore depends on how long the window regulator has been in use (total mechanical play) and the previous activations (position of the drawer 24 in the guiding slideway 22 at the end of the activations). Thus, for the implementation of the method, it can be envisioned that the total mechanical backlash and the backlash before start-up are measured. Thus, when an upwards movement of the window is commanded, a module (described below) is informed of the planned rotation for absorbing the backlash before start-up until the start of the loading of the window regulator.

The step of waiting for a given rotation can also include the step 30 of loading the window regulator. The determination of the rotation of the motor during the step 30 allows for partial determination of the rotation of the motor to be awaited before the step 40. To cause the window to start to move, the motor must drive the window out of its friction cone. For example, the motor must overcome various frictional forces in the window regulator, such as the friction between the window and the seal of the window guide, the friction between the cable and the protective cable sheath and the friction between the window slide and the slide guide rail. The frictional forces can in particular depend on external conditions, such as the temperature. In particular, the friction is significant when the temperature falls. For example, when the temperature falls, the slide seal stiffens and becomes less easily deformable by the moving window. When there is frost, the window is even at risk of becoming stuck to the seal. The motor must consequently develop greater torque to overcome the friction and start the movement of the window.

This has the effect of placing load on the window regulator during its use which, in the case of this method, can be considered to be obtained after a given rotation of the motor. The loading of the window regulator is a variable that depends on the type of window regulator and the conditions of use. The stiffness of the mechanism, i.e., the ratio of the force to the compression (or loading), is constant. The compression varies depending on the force to be exerted on the window to make it start depending on the ambient temperature and the presence or otherwise of frost. The climatic conditions not being known a priori at the time of the activation of the window regulator, and a constant rotation value is therefore imposed for the step 30. Preferably, the most unfavorable case will be considered in which the friction is greatest (low temperature). This case is evaluated in a climatic chamber at a temperature of 40° below zero. For example, the loading of the system can correspond to 0.16 N·m of mechanical torque applied by the motor or, taking account of the outputs and internal frictional forces, a force of 150 N applied to the window.

The determination of the number of revolutions at the step 20 then at the step 30 allows for the total rotation of the step of waiting for the rotation to be obtained.

The method can include an additional step 70 of updating the rotation partially determined by a model of the driving mechanism. In particular, the step 70 allows for the mechanical backlash of the window regulator to be updated. The maximum rotation to be carried out by the motor to absorb the backlash can vary with the wear of the window regulator. This allows for the method to be adapted to the operation over time of the window regulator, and thus for the anti-pinch system to be activated accurately over time. It consists of measuring the rotation of the motor up to the end of the absorption of the backlash where the maximum backlash was allowed for, and the end of the absorption corresponds to the maximum speed (minimum current).

The method then includes the step 40 of waiting for a given time period. This allows the motor to reach stable operation in which the variations in supply current are synonymous with pinching. In FIG. 2, the step 40 corresponds to the section of curve 14 after the inflection point 32. The curve 14 presents asymptotic behavior, signifying that the supply current tends to stabilize with a slight delay relative to the resisting torque. This delay is the electromechanical response time of the motor. The step 40 also corresponds to the section of curve 12 after the inflection point 34. The curve 14 presents asymptotic behavior, signifying that the motor speed tends to stabilize.

The time period can be determined as a function of the mechanical time constant of the motor. The time constant of the motor is equal to $J \cdot R/K^2$, J being the inertia of the motor rotor, R being the resistance at the terminals of the motor plus the line resistance, and K being the motor torque constant. Preferably, a waiting period of less than or equal to three times the time constant of the motor will be chosen. On the curve 14, after such a time period the supply current corresponds to 95% of the supply current in stable operation. This time period allows for a tradeoff to be achieved between the stabilization of the supply current at its limit and the delay taken to activate the anti-pinch system. The deviation of the supply current relative to its value in stable operation is less than a threshold value for the detection of an obstruction by the anti-pinch system.

The method then includes the step 50 of activating the anti-pinch system. The anti-pinch system can be of any type. It can be a system detecting an increase in current or detecting a decrease in speed when the movement of the window is hindered by an obstruction. In FIG. 2, the activation of the anti-pinch system occurs while the motor is in stable operation.

Through the method, the movement of the driving mechanism is broken up and the anti-pinch system can be activated as close as possible to the stable behavior of the motor and the driving mechanism. This prevents random activation of the system based only on waiting for a time period or for a given rotation of the motor.

The rotation of the motor can be detected by a Hall effect sensor. The sensor is fixedly mounted in the motor opposite a magnetic ring, and the magnetic ring is driven in rotation by the rotor of the motor. The magnetic ring has a half cycle of at least two polarities different from the sensor. At each change in polarity, the sensor emits a signal to a pulse counter. In this method, the determination of the rotation of the motor is carried out by counting the number of pulses of the counter. The step of waiting for a given rotation corresponds to the obtention of a number of pulses. Moreover, the more different successive polarities the sensor has, the more accurate the detection of the rotation of the rotor, and therefore the step of waiting for the rotation of the motor.

The method can be implemented regardless of the position of the window relative to the opening. For example, the method can be implemented whether the window is close to its raised position or close to its lowered position. Alternatively, it can also be envisioned that the method includes a preliminary step of determining of the position of the window in the openable member. Depending on the position of the window, the method can be implemented or not implemented. In other words, if the position of the window is close to its lowered position, the activation method can be deactivated. If the window is in a zone of pinching an obstruction, the activation method can then be implemented. The pinching zone can be determined for example by the pulse counter. Depending on whether the window is being raised or lowered, the counter counts up or counts down the pulses starting from the initial position. The initial position is, for example, a closed position of the window. For a given number of pulses, the window can be considered to be in the pinching zone and the method can be implemented.

The method can also be implemented depending on the direction of movement of the window. The pinching only occurs when the window is rising. It can then be envisioned that the method is only implemented when the window is rising.

Figure 5:
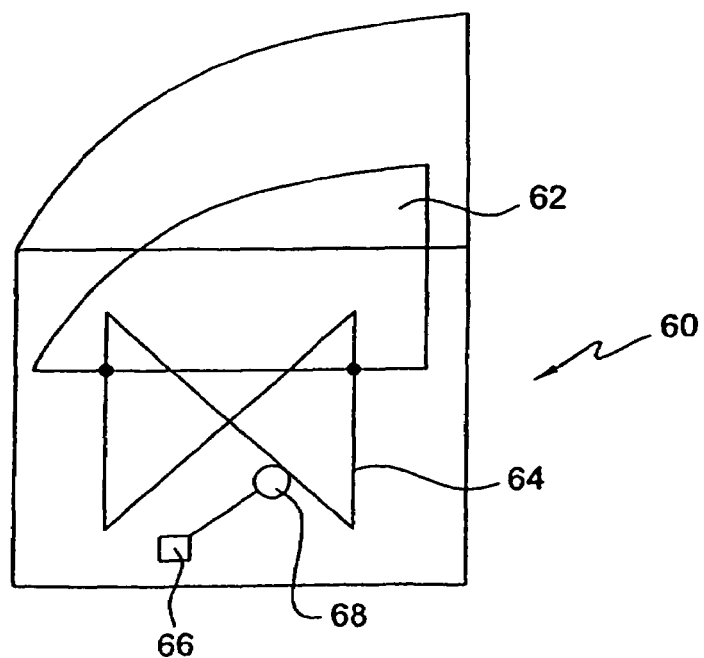
FIG. 5 shows a vehicle door.

FIG. 5 shows a vehicle door 60. The vehicle door 60 includes a window 62 driven by a window regulator 64. The vehicle door 60 also includes an anti-pinch system, allowing for the detection of pinching by the window 62 driven by the window regulator 64. The system is able to implement the method as described previously. The system includes a pulse counter at the output of a Hall effect sensor as indicated above. The system also includes a module 66 for controlling the operation of the system. The module 66 includes a plurality of routines. The module 66 includes a routine for the detection of the start-up of a drive motor 68 of the window regulator. The module 66 also includes a routine for waiting for a given rotation of the motor and a routine for waiting for a given time period. Similarly, the module 66 includes a routine for activating the anti-pinch system. These routines allow for reliable determination of the behavior of the window regulator when the window regulator is started. Moreover, the activation of the system depends on few constant physical parameters.

The routines can be programmed in the module 66. Tests are carried out on the model in advance as described in relation to FIGS. 3 and 4. The rotation of the motor to absorb the backlash is, for example, registered in the module 66 in the form of pulses. The rotation of the motor for the absorption of the compression is also recorded in the module 66. The programming of the module 66 can also be updated during the lifetime of the window regulator.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A method for activating an anti-pinch system for a vehicle openable member driving mechanism, the vehicle openable member driving mechanism comprising a drive motor, the method comprising the steps of:

starting the drive motor;

waiting for a given rotation of the drive motor;

then waiting for a given time period, the given time period being determined according to a mechanical time constant of the drive motor; and activating the anti-pinch system.

2. The method according to claim 1, further including the step of detecting rotation of the drive motor with a Hall effect sensor.

3. The method according to claim 1, further including the step of determining rotation of the drive motor, wherein the step of determining the rotation of the drive motor is made with a mathematical model of the vehicle openable member driving mechanism.

4. The method according to claim 3, wherein the step of waiting for the given rotation of the drive motor includes absorbing a backlash of the vehicle openable member driving mechanism and overcoming static friction of a window regulator.

5. The method according to claim 4, further including the step of updating the rotation of the drive motor that is determined by the mathematical model of the vehicle openable member driving mechanism.

6. The method according to claim 1, further including the step of determining rotation of the drive motor depending on the vehicle openable member driving mechanism and operating conditions of the vehicle openable member driving mechanism.

7. The method according to claim 1, wherein the given time period is less than or equal to three times the mechanical time constant.

8. The method according to claim 1, wherein an openable member is moveable in an opening, the method further including the step of detecting a position of the openable member in the opening, wherein the position of the openable member in the opening determines if the step of activating the anti-pinch system occurs.

9. The method according to claim 1, wherein an openable member is moveable in two opposite directions in an opening, the method further including a preliminary step of detecting a direction of movement of the openable member in the opening, wherein the direction of movement of the openable member in the opening determines if the step of activating the anti-pinch system occurs.

10. An anti-pinch system with a control module, the control module comprising:

a routine for detecting a start of a drive motor;

a routine for waiting for a given rotation of the drive motor;

a routine for waiting for a given time period, the given time period being determined according to a mechanical time constant of the drive motor; and a routine for activating the anti-pinch system.

11. A vehicle door comprising:

a window;

a window regulator driving the window; and an anti-pinch system including a control module, the control module including a routine for detecting a start of a drive motor, a routine for waiting for a given rotation of the drive motor, a routine for waiting for a given time period, the given time period being determined according to a mechanical time constant of the drive motor, and a routine for activating the anti-pinch system.

12. The vehicle door according to claim 11, wherein the control module of the anti pinch system is for a vehicle openable member driving mechanism, the vehicle openable member driving mechanism including the drive motor, wherein the control module starts the drive motor, waits for the given rotation of the drive motor, then waits for the given time period, and activates the anti-pinch system.

* * * * *